(12) United States Patent
Blome et al.

(10) Patent No.: US 11,920,630 B2
(45) Date of Patent: Mar. 5, 2024

(54) SELF-LUBRICATED SLIDING BEARING

(71) Applicant: KONINKLIJKE PHILIPS N.V., Eindhoven (NL)

(72) Inventors: Christian Herbert Blome, Hamburg (DE); Willem Potze, Geldrop (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 409 days.

(21) Appl. No.: 17/276,228

(22) PCT Filed: Sep. 10, 2019

(86) PCT No.: PCT/EP2019/074054
§ 371 (c)(1),
(2) Date: Mar. 15, 2021

(87) PCT Pub. No.: WO2020/058032
PCT Pub. Date: Mar. 26, 2020

(65) Prior Publication Data
US 2022/0049740 A1 Feb. 17, 2022

(30) Foreign Application Priority Data
Sep. 20, 2018 (EP) .................................... 18195598

(51) Int. Cl.
*F16C 17/02* (2006.01)
*F16C 33/10* (2006.01)

(52) U.S. Cl.
CPC ........ *F16C 17/026* (2013.01); *F16C 33/1065* (2013.01); *F16C 33/107* (2013.01); *F16C 2380/16* (2013.01)

(58) Field of Classification Search
CPC .. F16C 33/107; F16C 33/1065; F16C 17/026; F16C 2380/16; F16C 33/14;
(Continued)

(56) References Cited

U.S. PATENT DOCUMENTS

| 4,678,348 A | 7/1987 | Tielemans |
| 6,276,831 B1 | 8/2001 | Takahashi |
| (Continued) | | |

FOREIGN PATENT DOCUMENTS

| DE | 102009048460 A1 | 5/2011 |
| EP | 3152449 B1 | 7/2018 |
| (Continued) | | |

OTHER PUBLICATIONS

PCT International Search Report, International application No. PCT/EP2019/074054 dated Nov. 6, 2019.

*Primary Examiner* — Irakli Kiknadze
(74) *Attorney, Agent, or Firm* — Larry Liberchuk

(57) ABSTRACT

A self-lubricated sliding bearing for a rotary X-ray tube comprises a first bearing member, a second bearing member configured to concentrically enclose a portion of the first bearing member, and a lubricant comprised in a gap between cooperating surfaces of the first bearing member and the second bearing member. The cooperating surface of the second bearing member or the first bearing member comprises a first region comprising a pumping pattern configured to pump the lubricant. The cooperating surface of the second bearing member or the first bearing member comprises a second region having a modified pumping pattern or a smooth surface. The second region is disposed on the cooperating surface of the second bearing member or the first bearing member, such that a bearing force generated by the pumping action of the lubricant opposes a radial load force exerted on the self-lubricated sliding bearing to reduce an eccentricity of a longitudinal axis of the first bearing member with respect to a longitudinal axis of second bearing member.

11 Claims, 8 Drawing Sheets

(58) Field of Classification Search
CPC .. F16C 33/109; F16C 17/107; F16C 33/1085; F16C 17/10; F16C 33/103; F16C 33/24; F16C 17/028; F16C 17/105; F16C 43/02; F16C 33/106; F16C 17/02; F16C 17/045; F16C 33/201; F16C 2210/08; F16C 33/04; F16C 2202/04; F16C 2360/46; F16C 2223/70; F16C 2370/12; F16C 33/105; F16C 21/00; H01J 35/104; H01J 2235/108; H01J 2235/1066; H01J 2235/1026; H01J 2235/106; H01J 35/1017; H01J 35/1024; H01J 2235/1086; H01J 2235/20; H01J 2235/1046; G11B 19/2036; G11B 19/2045; G11B 33/148; A61B 6/032; A61B 6/4488; A61B 6/035; B23K 26/361; H05G 1/04; B23P 15/003
USPC .......................................... 378/119, 132, 133
See application file for complete search history.

(56) References Cited

U.S. PATENT DOCUMENTS

| | | |
|---|---|---|
| 6,430,261 B1 | 8/2002 | Bathe |
| 7,438,476 B2 | 10/2008 | Gotoh |
| 9,771,978 B2 | 9/2017 | Potze |
| 2005/0169561 A1 | 8/2005 | Asada |
| 2008/0155829 A1 | 7/2008 | Hou |
| 2016/0047415 A1 | 2/2016 | Hunt |
| 2017/0097049 A1* | 4/2017 | Bachmaan ............ F16C 17/107 |
| 2017/0169984 A1* | 6/2017 | Tiwari .................. H01J 35/104 |
| 2018/0061611 A1* | 3/2018 | McCabe ............... H01J 35/104 |
| 2018/0114669 A1* | 4/2018 | Sporbeck ........... H01J 35/1017 |
| 2018/0350551 A1* | 12/2018 | Greenland ............ H01J 35/107 |
| 2019/0066964 A1* | 2/2019 | Emaci .................. H01J 35/103 |
| 2019/0162237 A1* | 5/2019 | Gorrilla ................. F16C 39/06 |

FOREIGN PATENT DOCUMENTS

| | | |
|---|---|---|
| JP | H0211917 A | 1/1990 |
| JP | H1089348 A | 4/1998 |
| JP | 2005180468 A | 7/2005 |
| JP | 2013194811 A | 9/2013 |
| WO | WO2013046083 A1 | 4/2013 |

* cited by examiner

SELF-LUBRICATED SLIDING BEARING

FIELD OF THE INVENTION

This application relates to a self-lubricated sliding bearing, a rotary X-ray tube, an X-Ray imaging system, and a method of manufacturing a self-lubricated sliding bearing.

BACKGROUND OF THE INVENTION

Self-lubricated sliding bearings, sometimes referred to as hydrodynamic bearings, are applied when a rotary force needs to be transmitted in demanding mechanical and thermal conditions. For example, in high-end rotating anode X-Ray tubes, a self-lubricated sliding bearing system is used to support the rotating anode.

Typically, self-lubricated sliding bearings are provided as radial bearings having an optimized groove angle at a fixed groove depth. The groove angle is optimized with respect to the load carrying capacity.

WO 2013/046083 A1 discusses some design considerations of a self-lubricated sliding bearing for use in an X-Ray tube. However, as the gantry rotation speed and anode rotation speed of X-Ray applications (such as CT scanners) increase, such sliding bearings may be further developed to better resist the demanding conditions caused thereby.

EP 3152449 discloses a hydrodynamic bearings exploit the properties of pumping action in a fluid to support a bearing load.

US 2016047415 discloses various methods and systems for providing coatings and textures to surfaces of a bearing assembly in an x-ray system.

SUMMARY OF THE INVENTION

Thus, there may be a need to provide an improved self-lubricated sliding bearing.

The object of the present invention is solved by the subject-matter of the independent claims. Further exemplary embodiments are evident from the dependent claims in the following description.

According to a first aspect, there is provided a self-lubricated sliding bearing for a rotary X-ray tube comprising:
a first bearing member;
a second bearing member configured to concentrically enclose a portion of the first bearing member; and
a lubricant comprised in a gap between cooperating surfaces of the first bearing member the second bearing member.

The cooperating surface of the second bearing member or the first bearing member comprises a first region comprising a pumping pattern configured to pump the lubricant. The cooperating surface of the second bearing member or the first bearing member comprises a second region having a modified pumping pattern, or a smooth surface.

The second region is disposed on the cooperating surface of the second bearing member or the first bearing member such that, in use, a bearing force generated by the pumping action of the lubricant opposes a radial load force exerted on the self-lubricated sliding bearing in use, to thus reduce an eccentricity of the longitudinal axis of the first bearing member with respect to the longitudinal axis of second bearing member.

Accordingly, it is possible to provide a self-lubricating sliding bearing that can be mounted relative to a direction of motion of the bearing, so that the effect of a radial load force incident on the bearing can be compensated, substantially reduced, or even canceled. In other words, the eccentricity of a member of a self-lubricating sliding bearing caused by the effect of a radial load force incident on the bearing (or a centrifugal force) can be substantially reduced or even canceled. Such a self-lubricating sliding bearing has a higher load-bearing characteristic and can be used in a CT scanner having a relatively faster gantry rotation speed without requiring a full redesign of the bearing. In addition, regions of negative pressure inside the self-lubricating sliding bearing are greatly reduced.

Optionally, the second region is located on the cooperating surface of the first or second bearing member at a first point defined by a first axial length along a first direction of the longitudinal axis of the respective first or second bearing member, and a first circumferential length around the circumference of the cooperating surface of the respective first bearing member or second bearing member.

Accordingly, the second region moderates or eliminates the pumping action of the pumping pattern of a self-lubricating sliding bearing to enable the eccentricity of the bearing in use to be corrected.

Optionally, the position on the circumference of the cooperating surface of the respective first bearing member or second bearing member is aligned with the radial load force exerted on the self-lubricated sliding bearing, in use.

Accordingly, the cancellation effect of the second region is at its greatest if the second region of the cooperating surface is aligned with the radial load force in use.

Optionally, the cooperating surface of the second bearing member or the first bearing member further comprises a third region having a further modified pumping pattern, or a smooth surface, wherein the third region is located on the cooperating surface of the first or second bearing member at a second point defined by a second axial length along a first direction of the longitudinal axis of the respective first or second bearing member, and a second circumferential length around the cooperating surface of the respective first bearing member or second bearing member.

Accordingly, a third region can be provided that reinforces the effect of the second region. Optionally, the third region can have a modified pumping pattern compared to the second region, enabling finer control of the eccentricity of the self-lubricating sliding bearing in use. For example, the presence of a second region means that a bearing member of the self-lubricating sliding bearing can only be tilted on its longitudinal axis with respect to the radial load force. The action of a second and third region in combination means that a more complex vector can be provided that, for example, acts to tilt and to translate the longitudinal axis of the bearing member.

Optionally, the second circumferential length around the cooperating surface of the respective first bearing member or second bearing member is the same as the first circumferential length, so that the first and second points defining the locations of the respective second and third regions are in circumferential alignment along the longitudinal axis of the first bearing member or second bearing member.

Optionally, the second region has a square, rectangular, circular, trapezoidal, triangular, teardrop, or ellipsoidal shape.

Optionally, the second region comprises a surface having a pumping pattern with a smaller groove depth and/or width compared to the groove depth and/or width of the pumping pattern of the first region.

Optionally, the second region comprises a surface having a pumping pattern with a groove depth and/or width that becomes continuously shallower around the second circumferential length compared to the groove depth and/or width of the pumping pattern of the first region.

Optionally, the second region comprises a surface having a pumping pattern comprising a modified groove geometry compared to the pumping pattern of the first region.

Optionally, the second region has an area in a range of 5-30% in proportion to the total surface of the first or second bearing members.

Accordingly, the pumping pattern of the second region can be optimized to provide a pressure distribution in the lubricant causing a smaller eccentricity in the bearing that has a minimum area of under pressures (i.e. negative pressures) and that generates a force that counterbalances the radial load force.

According to a second aspect, there is provided a rotary X-ray tube comprising a self-lubricated sliding bearing according to the first aspect or its embodiments.

Accordingly, an X-Ray tube with a high resistance to radial loads, higher load handling characteristic and/or a longer life (because the bearing members do not collide with each other in the presence of heavy radial loads) may be provided.

According to a third aspect, there is provided an X-ray imaging system comprising:
 a region of interest for performing X-ray imaging of a patient;
 a gantry surrounding the region of interest;
 an X-ray source comprising the rotary X-ray tube according to claim 10 mounted to the gantry and movable around the region of interest; and
 an X-ray detector configured to receive X-rays emitted by the X-ray source.

The rotary X-ray tube is aligned in the X-ray source so that the second region of the self-lubricated sliding bearing is aligned with a centrifugal force exerted on the X-ray tube by the motion of the X-ray source around the gantry in use, so that the centrifugal force is opposed by a bearing force generated by the pumping action of the lubricant, to thus reduce an eccentricity of the longitudinal axis of the first bearing member with respect to an axis of second bearing member.

Accordingly, an X-Ray imaging system may be provided having a much faster gantry rotation speed for a given rotary X-Ray source, because the rotary X-Ray source may be adapted to be more resistant to radial loads without redesigning the entire self-lubricating bearing.

According to a fourth aspect, there is provided a method of manufacturing a self-lubricated sliding bearing comprising:
 a) providing a first bearing member;
 b) providing a second bearing member configured to concentrically enclose a portion of the first bearing member;
 c) forming a cooperating surface of the second bearing member or the first bearing member comprising a first region comprising a pumping pattern configured to pump a lubricant;
 d) forming a cooperating surface of the second bearing member or the first bearing member comprising a second region having a modified pumping pattern, or a smooth surface, wherein the second region is disposed on the cooperating surface of the second bearing member or the first bearing member such that, in use, a bearing force generated by the pumping action of the lubricant opposes a radial load force exerted on the self-lubricated sliding bearing in use, to thus reduce an eccentricity of an axis of the first bearing member with respect to an axis of second bearing member;
 e) introducing a lubricant into a gap between the first and second bearing members; and
 f) sealing the first and second bearing members.

In this application, the term "cooperating surface" means a facing surface of the first bearing member and the second bearing member configured to trap or compress a fluid lubricant in operation. The cooperating surface, or portion of it, may have a pumping pattern.

In this application, the term "pumping pattern" means a surface variation applied to a smooth surface of a portion of the bearing member that enables the pressure of a lubricant in a self-lubricating sliding bearing to be modulated. In particular, the pumping pattern may be provided as a herringbone pattern, a curved herringbone pattern, and the like as referred to in WO 2013/046083, manufactured by laser sintering, for example.

In this application, the term "modified pumping pattern" means an area having a pumping pattern that is less effective at pumping the lubricant compared to the "pumping pattern" described above. "Less effective" in this context may mean, for example, that the area having the modified pumping pattern generates a lower fluid pressure per unit area of the surface of the second bearing portion, at constant rotation speed of the bearing, compared to the pumping pattern. Accordingly, the "modified pumping pattern" could take the form of the same herringbone pattern used as a pumping pattern, but having one half or one third fewer grooves per unit area. Alternatively, or in combination, the "modified pumping pattern" can have grooves having a reduced depth, and thus a reduced pumping effect. The subsequent application will discuss several options for providing a "modified pumping pattern".

In the following application, the term "smooth surface" means, for example, a surface having an average root mean square roughness of 1 um or less.

It is, thus, a basic idea of the invention to introduce areas into the radial bearing (journal bearing) of a self-lubricated sliding bearing having a reduction in the effective pumping capacity, enabling the load carrying capacity of the bearing to be increased, and unwanted areas of low pressure in the bearing to be reduced in a use-case where high radial loads are exerted on the self-lubricated sliding bearing. In the absence of the areas of the radial bearing having a reduction in the effective pumping capacity (for example by omitting the grooved pumping pattern, or by reducing the depth of the grooves constituting the grooved pumping pattern), the high radial loads exerted on the self-lubricated sliding bearing would cause the radial shaft to become offset in comparison with its central axis (other words to acquire an eccentricity).

DETAILED DESCRIPTION OF EMBODIMENTS

Applications of X-Ray tubes, such as in CT scanners, are demanding higher gantry speeds, and thus the required load carrying capacity of the radial bearing in X-Ray tubes is also increasing. Existing radial bearing designs (with straight grooves) are not sufficient for anticipated radial loads. Although increasing the length and/or diameter of the pumping pattern of a typical self-lubricating bearing would improve the performance characteristics, the fundamental bearing geometry of existing systems would have to be altered, and to do so would mandate a full redesign of the X-Ray tube at great cost. The cost of manufacturing the radial bearing should also not be increased significantly.

Figure 1:
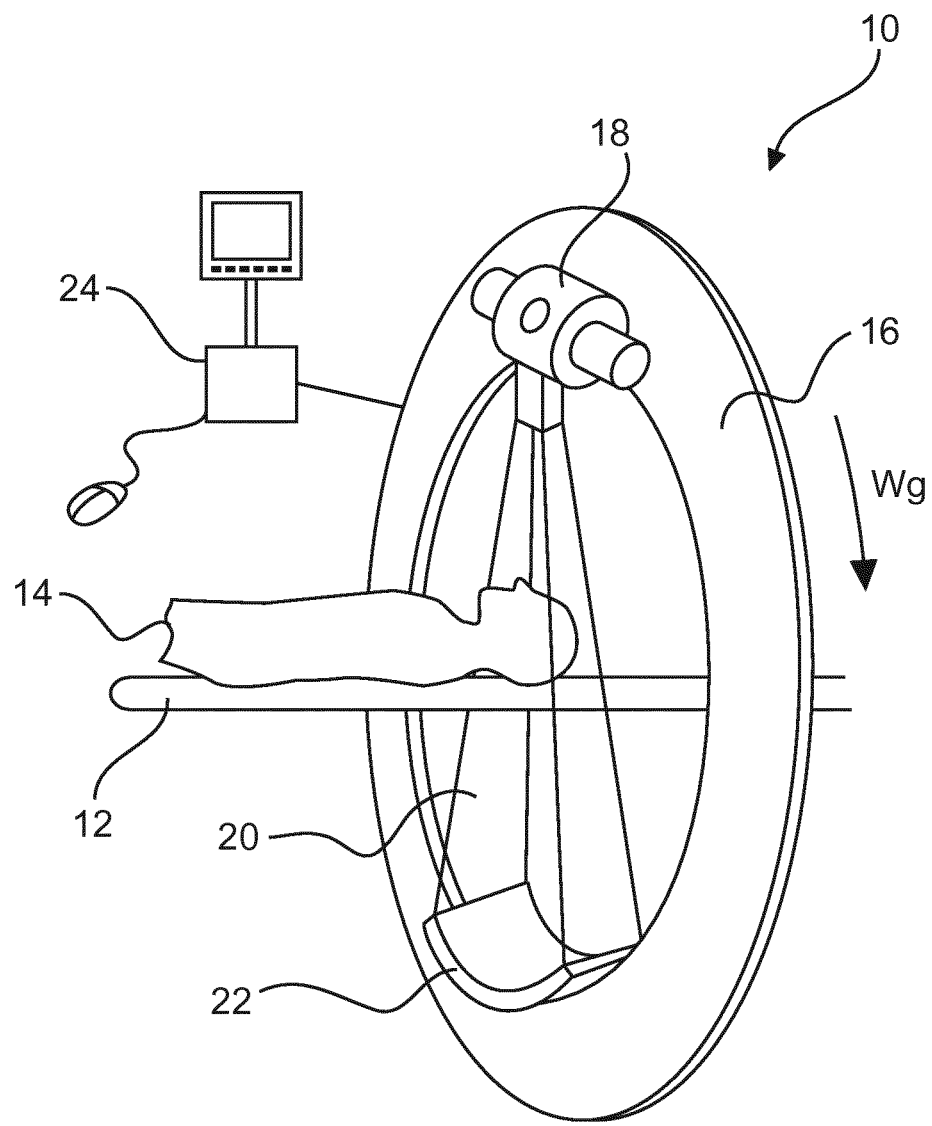
FIG. 1 schematically illustrates an X-Ray imaging system (CT-scanning system) according to the third aspect.

FIG. 1 schematically illustrates an X-Ray imaging system 10 (CT-scanning system) according to the third aspect. The X-Ray imaging system comprises a region of interest 12 for performing X-Ray imaging of a patient 14. The region of interest 12 is surrounded by a rotatable gantry 16. An X-Ray source 18 is rigidly attached to the rotatable gantry 16. In use, the X-Ray source 18 emits an X-Ray beam 20 towards the patient 14 in the region of interest 12. The X-Ray beam 20 passes through the patient 14 and is received by an X-Ray detector 22 rigidly mounted to the rotatable gantry 16, for example, opposite to the X-Ray source 18. Although a curved X-Ray detector 22 has been illustrated, it will be appreciated that any X-Ray detector capable of generating a X-Ray image of a patient may be used (such as a two-dimensional flat panel detector, or a one-dimensional slice detector). The X-Ray imaging system controller 24 receives X-Ray image data of a patient 14 from the X-Ray source 22.

It will be appreciated that the X-Ray source 18 is a rotary X-Ray source and contains a self-lubricating sealed bearing according to the first aspect which will be discussed subsequently. To place the first aspect in its context, FIG. 1 shows that the X-Ray source 18 is mounted on the gantry 16. Typically, the X-Ray source 18 and the gantry 16 are orientated to minimize or to remove gyroscopic momentum (the rotating components of the X-ray source may rotate at up to 200 Hz). This is achieved by ensuring that the axis of rotation of the rotating anode inside the X-Ray source 18 is aligned in parallel with the axis of rotation of the gantry 16.

Of course, slight deviations from the parallel alignment of the axis of rotation of the gantry 16 and the axis of rotation of the X-Ray source 18 may be contemplated (for example, to give a better beam elimination of the patient) but then a gyroscopic force component on the rotating components of the X-Ray source 18 will appear dependent upon the degree of misalignment of the axis of rotation of the gantry 16 to the axis of rotation of the X-Ray source 18. Under the assumption that the axis of rotation of the gantry 16 is aligned substantially in parallel with the axis of rotation of the rotating components of the X-Ray source 18, gyroscopic momentum will be minimized. However, even with such alignment, the rotating components of the X-Ray source 18 will still be subject to a radial load force (centrifugal force) linked to the angular velocity $\omega_g$ of the gantry 16 that affects rotating components of the X-Ray source 18.

The rotating components of a self-lubricating bearing in the X-Ray source 18, when subject to a radial load force (centrifugal force) during the gantry rotation, tend to acquire eccentricity. A self-lubricating bearing generally consists of a stationary and a rotating part floating on a lubricant. In other words, when the gantry is stationary, liquid pressure in the lubricant balances out, and the rotating part is typically balanced at a position that is equally spaced to the stationary part. However when the gantry moves, the radial load force exerted against the rotating part (suspended in the lubricant) tends to push the axis of rotation of the rotating part out of alignment with the longitudinal axis of the stationary part. In other words, one end of the rotating part is closer to the stationary part than an opposed end of the rotating part, which is further from the stationary part. In other words, the radial load force on a self-lubricating bearing in an X-Ray source causes the rotating part to acquire an eccentricity relative to the stationary part.

Figure 2A:
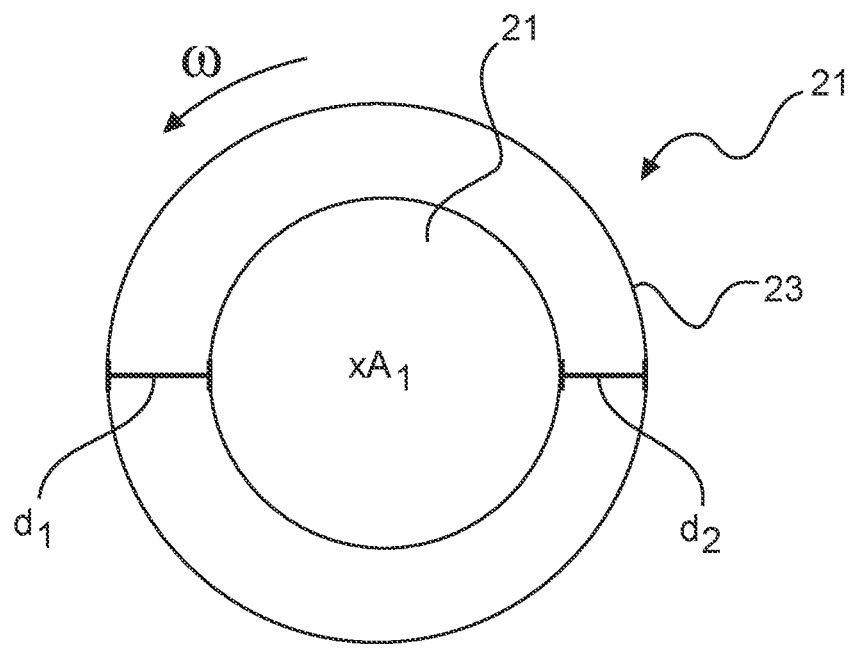
FIG. 2*a* schematically illustrates the forces exerted on a self-lubricating bearing in balanced operation.

FIG. 2a schematically illustrates a cut-through view of a self-lubricating bearing in balanced operation (with no or negligible radial load). A first bearing member 21 (shaft) is stationary, and a second bearing member rotates with a rotational velocity ω. The longitudinal axis $A_1$ of the first bearing member 21 follows the same path as the longitudinal axis (not shown) of the second bearing member 23. The longitudinal axis $A_1$ is orthogonal to the plane of rotation of an X-Ray image gantry, for example. In FIG. 2a, the gantry rotation speed is low enough to not exert a significant radial force on the self-lubricating sliding bearing. Accordingly, the second bearing member 23 is not eccentric with respect to the first bearing member 21. The width of the bearing gap $d_1$, $d_2$ is equal or substantially equal around the circumference at all points around the cross-section of the bearing.

Figure 2B:
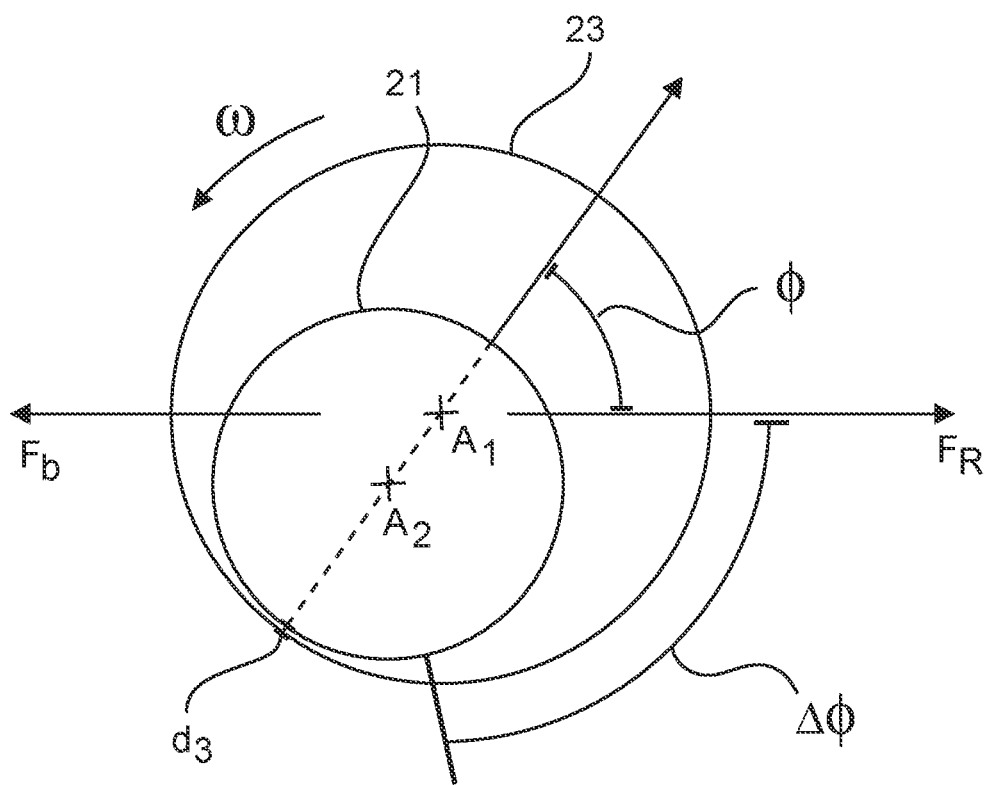
FIG. 2*b* schematically illustrates the forces exerted on a self-lubricating bearing in use, when a radial load force causes eccentricity in a self-lubricating bearing.

FIG. 2b schematically illustrates a cut-through view of a self-lubricating bearing in unbalanced operation. In this case, a significant radial force vector $F_R$ is exerted on a first side of the self-lubricating bearing, with a reaction force of the radial bearing $F_b$ also illustrated. It can be seen that the longitudinal axis $A_1$ of the first bearing member 21 is stationary, but that the longitudinal axis $A_2$ of the second bearing member 23 is offset in an eccentric manner such that the bearing gap is not equal, reaching a minimum at $d_3$.

An observation of this application is that the eccentricity illustrated in FIG. 2b arises because the coordinating surfaces of the self-lubricating sliding bearing comprise a pumping pattern around the entire circumference of the radial bearing, but the radial load force arises from a specific direction, leading to an unbalanced force on the second bearing member. This application proposes to reduce the effectiveness (for example, pressure induced in the lubricant per unit area of the bearing surface) of the pumping pattern around a sector of the circumference of a stationary coordinating surface of the self-lubricating sliding bearing to compensate the radial load force vector (a stationary coordinating surface of the bearing is a surface that does not move relative to the frame of reference of a supporting member such as a supporting CT gantry, for example).

By designing the special area of the stationary shaft to have a modified pumping pattern, it can be shown by Finite Element Modeling (FEM) simulation that the eccentricity and the pressure in the bearing can be determined such that the radial load force $F_R$ is counterbalanced, or reduced, by the force generated by the bearing. Therefore, by appropriate design of the special area of the shaft having a modified pumping pattern, the eccentricity of the bearing can be reduced or substantially removed for a given range of gantry rotation speeds. Of course, this assumes that the modified pumping pattern remains in a fixed position relative to the reference frame of the CT system's gantry.

Figure 3:
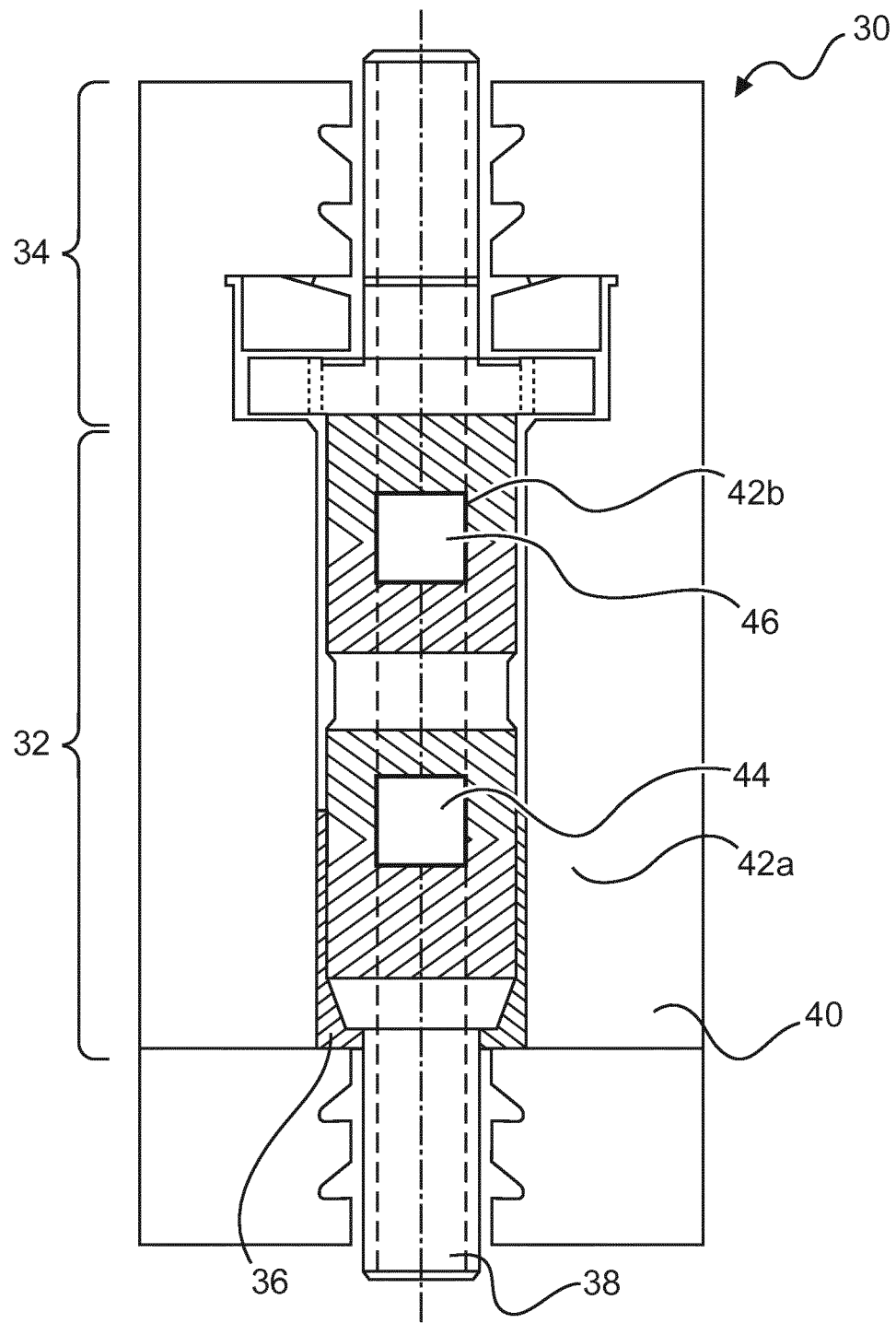
FIG. 3 schematically illustrates a side cut-through view of a self-lubricating sliding bearing according to the first aspect.

FIG. 3 schematically illustrates a side cut-through view of a self-lubricating sliding bearing according to the first aspect.

The self-lubricating bearing 30 (spiral groove bearing) generally comprises a radial bearing portion 32, a thrust bearing portion 34, and a lubricant 36 sealed in a bearing gap. A first bearing member 38 is provided as a shaft around which a second bearing member 40 concentrically encloses a portion of the first bearing member 38 whilst sealing lubricant 36 in the bearing gap between the first and second bearing members. The bearing gap between the first and second bearing members is typically between 10 μm and 20 μm, although a variation of this range can be made dependent on the application. Typically, a rotating anode disc (not shown in FIG. 2) of an X-Ray source 18 is rotatably attached to the second bearing member 40, and the first bearing member 38 is anchored to a support means. In other words, in a typical rotating X-Ray source 18, the second bearing member 40 rotates around a stationary first bearing member 38.

However, it will be appreciated that the self-lubricating bearing according to the first aspect is not so limited and according to a non-illustrated variation, the second bearing member 40 is stationary (relative to a frame of reference of a supporting member of the rotary X-ray source) and the first bearing member 38 is capable of rotating relative to the second bearing member 40.

The region (44, 46) containing a modified pumping pattern, or no pumping pattern, is, therefore, stationary relative to a frame of reference of a supporting member of the rotary X-ray source (such as a CT gantry, for example).

The first and second bearing members may be fabricated, for example, from molybdenum alloy, although other materials and alloys may be considered for the application of the self-lubricating bearing to other use scenarios that do not require such a demanding heat resilience.

The lubricant 36 is typically a conductive liquid metal such as "Galinstan" (GaInSn), although other materials capable of conducting electrical current (to the rotary anode) and withstanding the high temperatures and pressures in the bearing may be used.

The radial bearing portion 32 of the self-lubricating bearing comprises a first 42a and second 42b pumping pattern, which in the illustrated example is formed from herringbone groove patterns. Rotation of the second bearing member 40 relative to the first bearing member 38 causes the pumping patterns of the first bearing member 38 to force the relatively incompressible lubricant into a small zone of the bearing gap at a high fluid pressure, which separates the rotating and stationary bearing members.

The thrust bearing portion 34 of the self-lubricating bearing comprises further pumping patterns (not shown) to generate a pressure that forces the lubricant 36 to remain within the bearing gap.

In operation, the first 38 and second 40 bearing members are stationary. Upon the application of electrical current to a drive motor (not shown) a rotary force on the second bearing member 40 causes the second bearing member 40 to begin to rotate, with the movement of the lubricant 36 against the pumping patterns 42a and 42b and the thrust bearing portion 34 entering equilibrium such that the second bearing member 40 is suspended in the lubricant 36. Upon start-up and shutdown, the second bearing member 40 can collide with the first bearing member 38, but in equilibrium the second bearing member 40 does not contact the first bearing member 38.

Notably, in a self-lubricating bearing 30 according to the first aspect, a cooperating surface of the second bearing member or the first bearing member comprises a second region having a modified pumping pattern. FIG. 2 illustrates a self-lubricating bearing comprising a second region 44 having a first modified pumping pattern and a third region 46 having a second modified pumping pattern. In this case, both the first and second modified pumping patterns comprise smooth areas of the first bearing member 38 comprising no grooves. When no grooves are present in a portion of the first bearing member 38, that portion of the first bearing member 38 also has no, or highly reduced, pumping action.

Figure 4A:
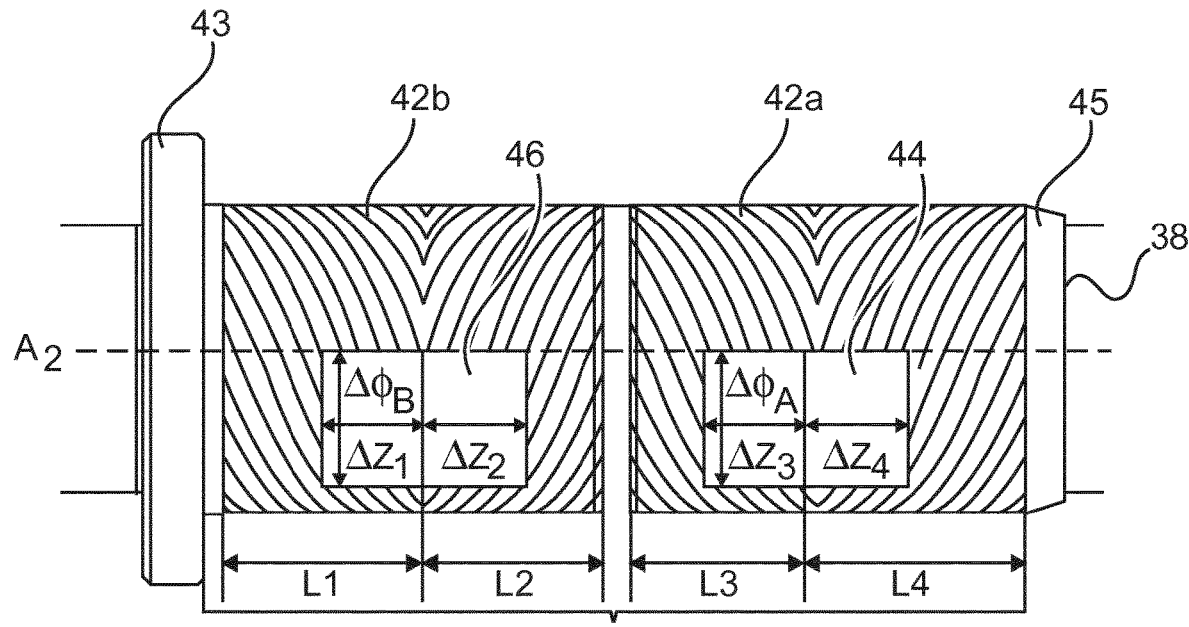
FIG. 4a schematically illustrates a side view of the external surface of a first bearing member according to the first aspect.

FIG. 4 schematically illustrates a side view of the external surface of a modified bearing member (bearing journal) according to an embodiment of the first aspect.

In FIG. 4, the first bearing member 38, forming a radial bearing, is illustrated in isolation from the remainder of the self-lubricating bearing. The illustrated embodiment of the first bearing member 38 would remain stationary relative to the frame of reference of a gantry upon which it was used. For reference, the first bearing member 38 comprises a proximal end 43. Optionally, the proximal end and/or the distal end comprise a thrust bearing pattern (not shown). The longitudinal axis of the first bearing member 38, $A_2$, is illustrated using a dotted line. A second region 44 of the first bearing member 38 comprises a modified pumping pattern, or a smooth surface. As illustrated in FIG. 3, the modified pumping pattern or smooth surface may be provided in a rectangular or square configurations, but it will be appreciated that this is simply an option and the modified pumping pattern or smooth surface of the first bearing member 38 may be provided in a circular, triangular, teardrop, elliptical, or custom-designed shape.

A third region 46 of the first bearing member 38 comprises a further modified pumping pattern, or smooth surface. However, it will be appreciated that optionally, the first bearing member 38 may be provided with only one region comprising modified pumping pattern or smooth surface.

The remainder of the surface of the first bearing member 38 (shaft) comprises a conventional pumping pattern 42a, 42b.

The second region 44 of the illustrated first bearing member 38 is centred at the location $L_1+L_2+L_3$ of the first bearing member 38, in other words the second region 44 is centred at three quarters of the distance along the first bearing member 38 from the proximal end 43. The second region 44 is subdivided at its centre point by a distance $\Delta z_3$ towards the proximal end 43, and a distance $\Delta z_4$ towards the distal end 45. The second region 44 is formed over a sector of the cylinder of the first bearing member 38 defined by the rectangular area having a width of $\Delta z_3 + \Delta z_4$, and a cylindrical segment extending around the circumference of the first bearing member 38 along a circumferential segment $\Delta \phi_A$. For ease of illustration, the cylindrical segment is illustrated as a rectangle superimposed on top of the first bearing member 38. Optionally, the length $\Delta z_3 = \Delta z_4$.

Optionally, $\Delta z_3$ is in one of the approximate ratios to $\Delta z_4$ of, for example, 1:1.5, 1:2, 1:2.5, 1:3, 1:3.5, 1:4. This has the effect of biasing the position of the second region 44 further towards the distal end 45 of the first bearing member 38, to thus position the region of lower pumping pressure closer to the end of the self-lubricating bearing.

Optionally, $\Delta z_3$ is in one of the approximate ratios to $\Delta z_4$ of, for example, 4:1, 3.5:1, 3:1, 2.5:1, 2:1, 1.5:1. This has the effect of biasing the position of the second region 44 further towards the proximal end 43 of the first bearing member 38, to thus position the region of lower pumping pressure closer to the centre of the self-lubricating bearing.

Optionally, $\Delta \phi_A$ varies between the end of the second region 44 closer to the proximal end 43 and the distal end 45 of the first bearing member 38. The effect of this is to vary the pumping pressure gradually along the axial direction $A_2$ of the bearing.

In one variation, $\Delta \phi_A$ at the end of the second region 44 close to the proximal end 43 may be provided in ratio to $\Delta \phi_A$ at the end of the second region 44 close to the distal end 43 in one of the approximate ratios 1:0.9, 1:0.8, 1:0.7, 1:0.5, 1:0.4, 1:0.3, 1:0.2, 1:0.1. The effect of this is to gradually reduce the pumping pressure in the axial direction $A_2$ as the distal end 45 of the bearing is approached.

In another variation, $\Delta \phi_A$ at the end of the second region 44 close to the proximal end 43 may be provided in ratio to $\Delta \phi_A$ at the end of the second region 44 close to the distal end 43 in one of the approximate ratios 0.9:1, 0.8:1, 0.7:1, 0.6:1, 0.5:1, 0.4:1, 0.3:1, 0.2:1, 0.1:1. The effect of this is to gradually increase the pumping pressure in the axial direction $A_2$ as the distal end 45 of the bearing is approached.

Optionally, a third region 46 of the illustrated first bearing member 38 may be provided. The third region 46 is centred at the location $L_1$ away from the proximal end 43.

The third region 46 is subdivided at its centre point by a distance $\Delta z_1$ towards the proximal end 43, and a distance $\Delta z_2$ towards the distal end 45. The second region 44 is formed over a sector of the cylinder of the first bearing member 38 defined by the rectangular area having a width of $\Delta z_1 + \Delta z_2$, and a cylindrical segment extending around the circumference of the first bearing member 38 along a circumferential segment $\Delta \phi_B$. For ease of illustration, the cylindrical segment is illustrated as a rectangle superimposed on top of the first bearing member 38. Optionally, the length $\Delta z_1 = \Delta z_2$.

Optionally, $\Delta z_1$ is in one of the approximate ratios to $\Delta z_2$ of, for example, 1:1.5, 1:2, 1:2.5, 1:3, 1:3.5, 1:4. This has the effect of biasing the position of the third region 46 further towards the distal end 45 of the first bearing member 38, to thus position the region of lower pumping pressure closer to the end of the self-lubricating bearing.

Optionally, $\Delta z_1$ is in one of the approximate ratios to $\Delta z_2$ of, for example, 4:1, 3.5:1, 3:1, 2.5:1, 2:1, 1.5:1. This has the effect of biasing the position of the third region 46 further towards the proximal end 43 of the first bearing member 38, to thus position the region of lower pumping pressure closer to the centre of the self-lubricating bearing.

In one variation, $\Delta \phi_B$ at the end of the third region 46 close to the proximal end 43 may be provided in ratio to $\Delta \phi_B$ at the end of the third region 46 close to the distal end 43 in one of the approximate ratios 1:0.9, 1:0.8, 1:0.7, 1:0.5, 1:0.4, 1:0.3, 1:0.2, 1:0.1. The effect of this is to gradually reduce the pumping pressure in the axial direction $A_2$ as the distal end 45 of the bearing is approached.

In another variation, $\Delta \phi_B$ at the end of the third region 46 close to the proximal end 43 may be provided in a ratio to $\Delta \phi_B$ at the end of the third region 46 close to the distal end 43 in one of the approximate ratios 0.9:1, 0.8:1, 0.7:1, 0.6:1, 0.5:1, 0.4:1, 0.3:1, 0.2:1, 0.1:1. The effect of this is to gradually decrease the pumping pressure in the axial direction $A_2$ as the proximal end 43 of the bearing is approached.

Optionally, the second and third regions may be made so large that they join up into a unified region extending substantially the whole length of the first bearing member along its axis $A_2$.

Of course, the second region 44 and the third region 46 may be provided with a wide range of different combinations of the options outlined above, so that the pressure within the bearing in the direction of the radial force can be compensated to reduce eccentricity as the gantry moves dependent on the design of the CT scanner or C-arm system.

Figure 4B:
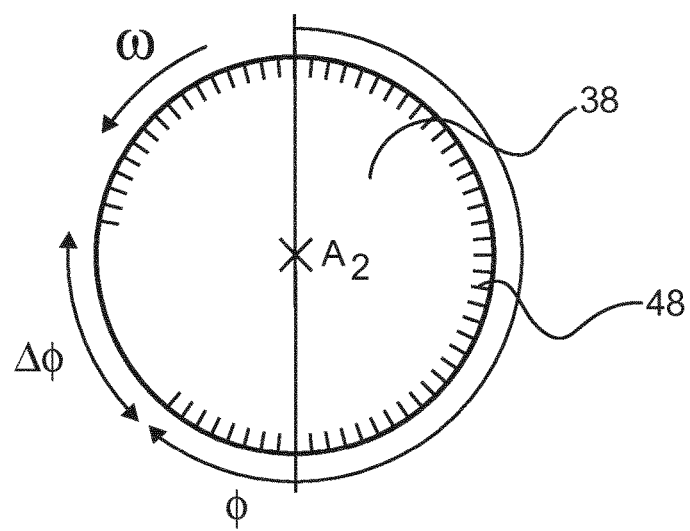
FIG. 4b schematically illustrates a cut-through view of a first bearing member according to the first aspect along the longitudinal axis of the first bearing member.

FIG. 4b schematically illustrates a cut-through view of a first bearing member 38 according to the first aspect along the longitudinal axis $A_2$ of the first bearing member 38. The arrow ω indicates the direction of rotation of the concentrically enclosing second bearing member 40 (not shown), because in a self-lubricating sliding bearing for an X-Ray source the first bearing member 38 (shaft) is stationary. A first portion $\Delta \phi$ of the surface of the first bearing member 38 (shaft) is provided with a modified pumping pattern, or no pumping pattern (a smooth surface). The remainder φ of the surface of the first bearing member 38 (shaft) is provided with the conventional grooved pattern 48, for example. Portions of the first bearing member 38 having the conventional grooved pattern 48 will provide a relatively high pumping pressure, and the portion $\Delta \phi$ of the surface of the first bearing member 38 (shaft) provided with a modified pumping pattern, or no pumping pattern (a smooth surface) will provide a smaller or negligible pumping pressure. Accordingly, if the stationary first bearing member 38 is mounted so that the portion $\Delta \phi$ of the surface of the first bearing member 38 (shaft) is aligned towards, or in the same direction as, the direction of the radial load force incident on the self-lubricating sliding bearing, the eccentricity of the second bearing member 40 with respect to the first bearing member 38 is reduced or substantially removed.

The discussion above has been aimed at a self-lubricating sliding bearing for use in a rotating anode X-Ray source, wherein the central shaft (first bearing member 38) is stationary with respect to a frame of reference of a rotating gantry, and the second bearing member 40 concentrically enclosing and sealing the first bearing member 40 rotates around the first bearing member 38 (shaft) and is attached to the rotating anode. Of course, the principles discussed above may be applied to a self-lubricating sliding bearing in which the first bearing member 38 (shaft) rotates, and the second bearing member 40 (concentrically enclosing the rotating shaft) is stationary. In this case, the modified pumping pattern is provided on the second bearing member 40, although all design options discussed above are still relevant.

The second and third regions are provided with either a modified pumping pattern having a reduced pumping characteristic (compared to the pumping pattern covering the remainder of the relevant bearing surface, or a smooth surface.

Optionally, the modified pumping pattern can be provided with grooves having a reduced depth compared to the depth of the grooves of the pumping pattern not in the second and/or third regions. In particular, the ratio of the depth of the grooves in the second and/or third regions compared to the depth of the grooves in the pumping pattern not in the second and/or third regions may be approximately one of the ratios taken from the list: 0.9:1, 0.8:1, 0.7:1, 0.6:1, 0.5:1, 0.4:1, 0.3:1, 0.2:1, 0.1:1, 0.05:1.

Optionally, the modified pumping pattern comprises grooves having a continuously varying depth in the second and/or third regions. For example, a conventional pumping pattern is provided, but in locations of the conventional pumping pattern corresponding to the second and/or third regions, the depth of the grooves in the second/and or third regions is continuously reduced to zero by a following boundary of the second and/or third regions.

Optionally, the pumping pattern of the bearing surface not in the second and/or third regions is a curved pumping pattern having curved grooves (an appreciable radius of curvature) and the modified pumping pattern has straight grooves.

Optionally, the modified pumping pattern comprising a smooth surface provided as a depressed portion of the first and/or second bearing members. In particular, the modified pumping pattern is provided as a smooth surface that has average depth of more than 1 µm, 2 µm, 3 µm, 4 µm, 5 µm, 6 µm, 7 µm, 8 µm, 9 µm, or 10 µm compared to the datum (average) surface depth of the first and/or second bearing members.

Optionally, the modified pumping pattern comprising a smooth surface provided as a raised (mesa) portion of the first and/or second bearing members. In particular, the modified pumping pattern is provided as a smooth surface that has average height of more than 1 µm, 2 µm, 3 µm, 4 µm, 5 µm, 6 µm, 7 µm, 8 µm, 9 µm, or 10 µm.

Accordingly, a number of methods have been outlined allowing areas of the radial bearing to increase the load carrying capacity of the bearing (because eccentricity of the bearing is related to the load carried by a bearing) and areas of low pressure in the bearing can be reduced.

Optionally, the second and/or third region has an area in a range of 5-30%, 5-25%, 2-20%, 5-15%, or 5-10% in proportion to the total surface of the first and/or second bearing members.

It is considered that a self-lubricating sliding bearing according to the first aspect can be provided in many different forms and dimensions whilst remaining faithful to the inventive concept.

Finite Element Modeling (FEM) simulations have been performed to validate the proof of the concept discussed above.

Figure 5A:
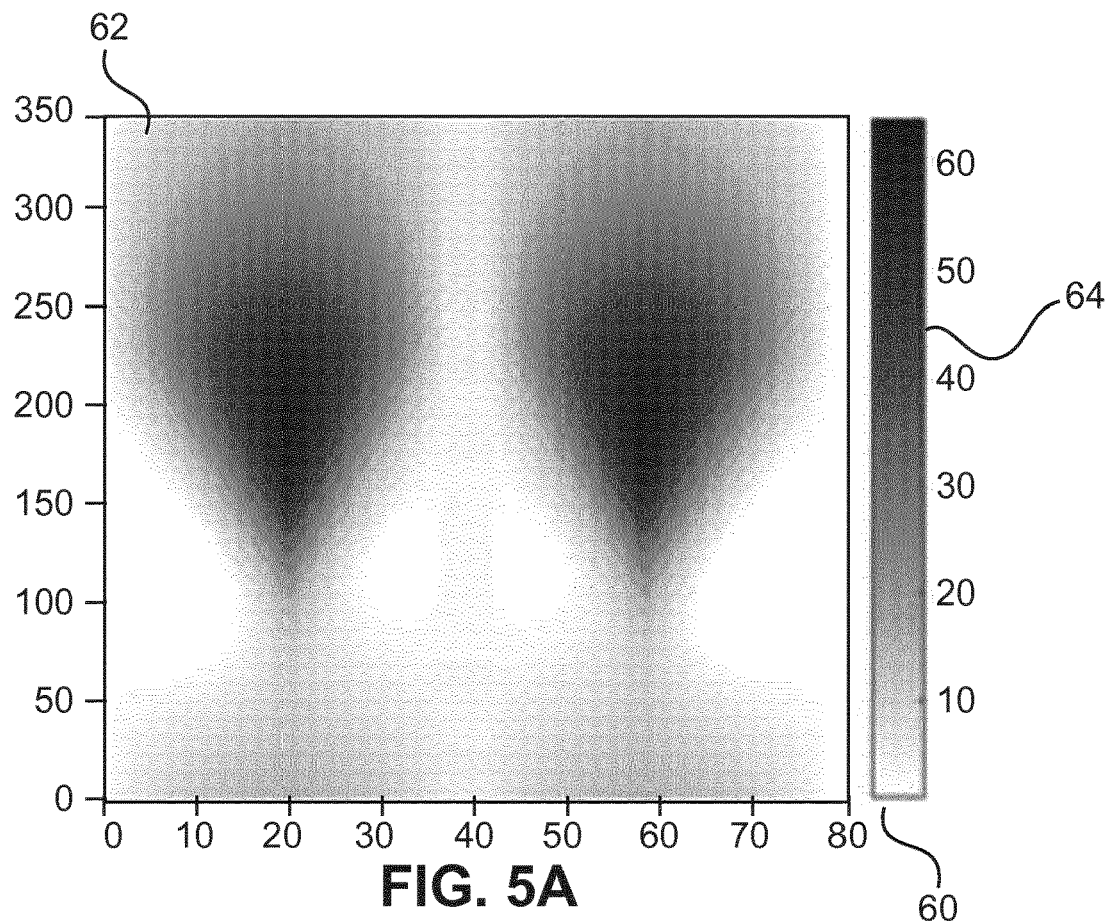
FIG. 5a illustrates a result of a simulation of the pressure distribution in a highly loaded prior-art self-lubricated sliding bearing.

FIG. 5a illustrates the pressure distribution in a highly loaded conventional self-lubricated bearing having straight grooves. In particular, the x-axis 60 represents the longitudinal axial coordinate along the bearing in mm, and the y-axis 62 represents the circumferential coordinate around the bearing. The legend 64 is a pressure scale of the greyscale pressure characteristic ranging between 0 and 65 $10^5$ Nm$^{-2}$.

Figure 5B:
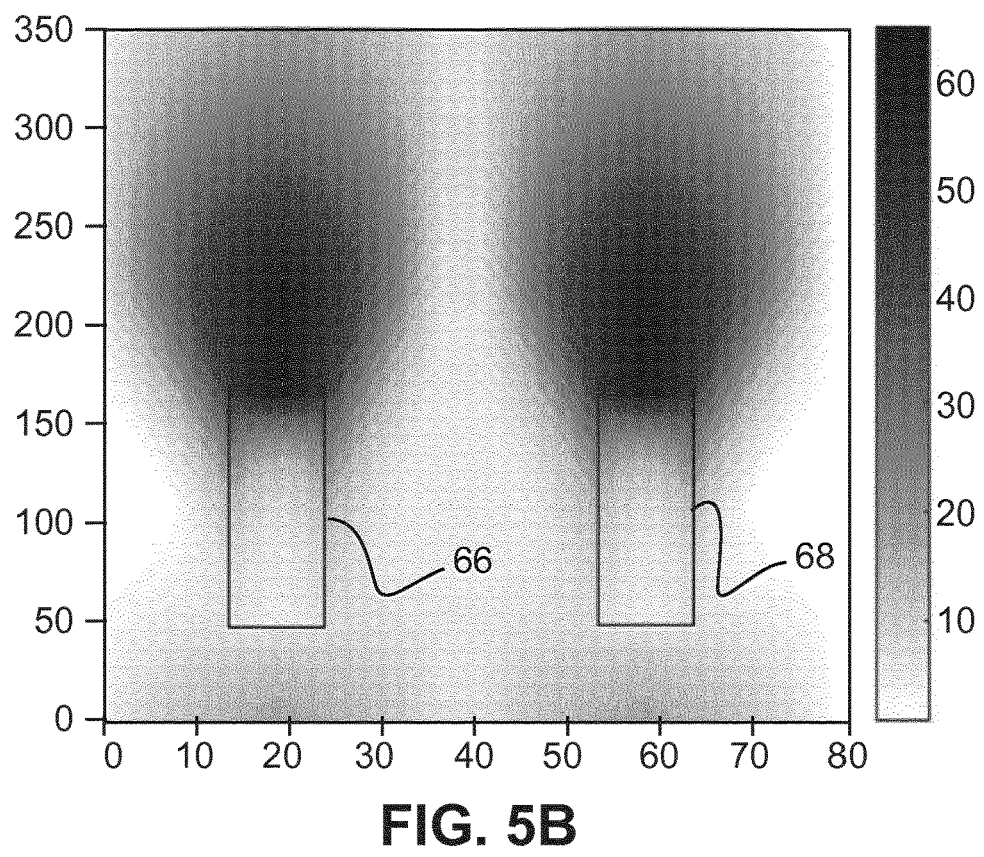
FIG. 5b illustrates a result of a simulation of the pressure distribution in a highly loaded self-lubricated sliding bearing.

FIG. 5b illustrates a result of a simulation of the pressure distribution in a highly loaded self-lubricated sliding bearing according to the first aspect. The axes and scale are common to those of FIG. 5a. The location of a modified pumping pattern on the stationary bearing shaft having no grooves is shown by boxes 66 and 68.

In FIG. 5b, there is a significant reduction in pressure at the regions of the bearing having the no groove area. In the simulation, this led to reduction in eccentricity of the longitudinal axis of the concentric (floating) bearing component to the longitudinal axis of the shaft (fixed) bearing component of 22%.

Figure 6A:
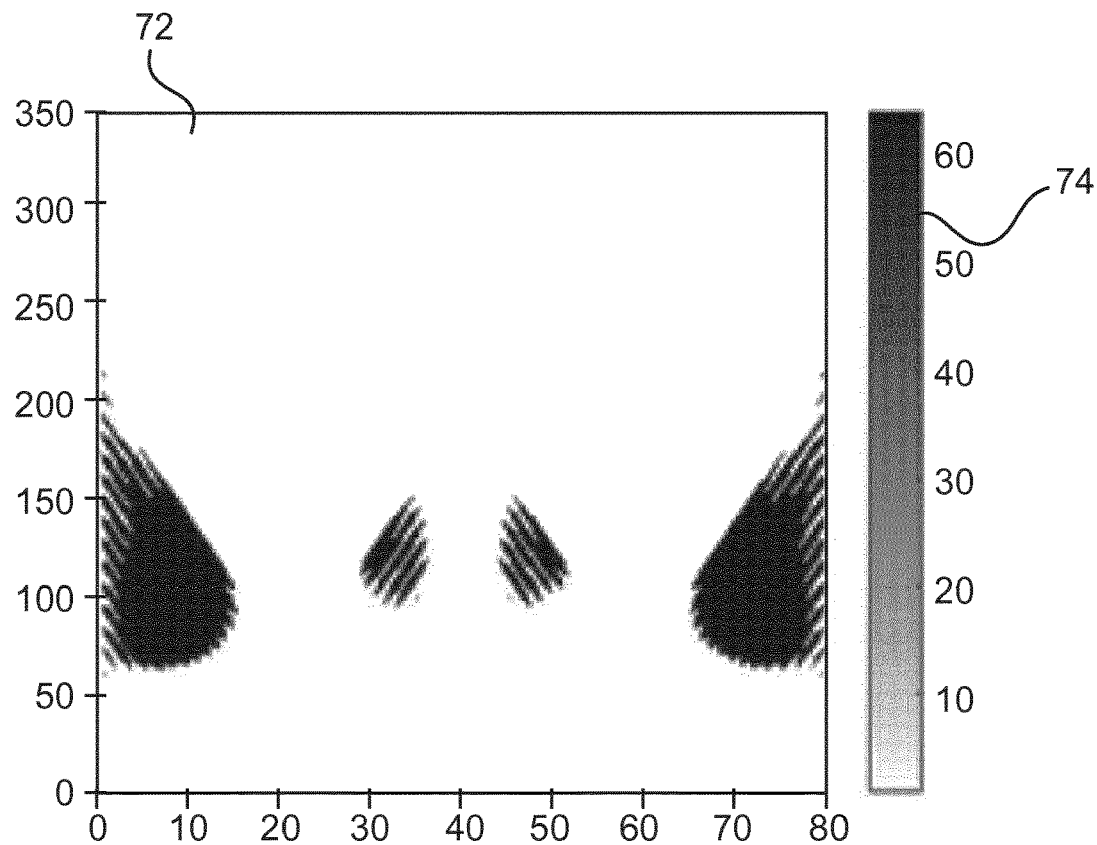
FIG. 6a illustrates a result of a simulation of the switch function (area of zero or negative pressure) of a highly loaded prior-art self-lubricated sliding bearing.

FIG. 6a illustrates the "switch function" distribution of the highly loaded conventional self-lubricated bearing having straight grooves illustrated in FIG. 5a (The switch function highlights areas of negative pressure). In particular, the x-axis 70 represents the longitudinal axial coordinate along the bearing in mm, and the y-axis 72 represents the circumferential coordinate around the bearing. The legend 74 is a pressure scale of the greyscale pressure characteristic ranging linearly between 0 and 65 $10^5$ Nm$^{-2}$.

Figure 6B:
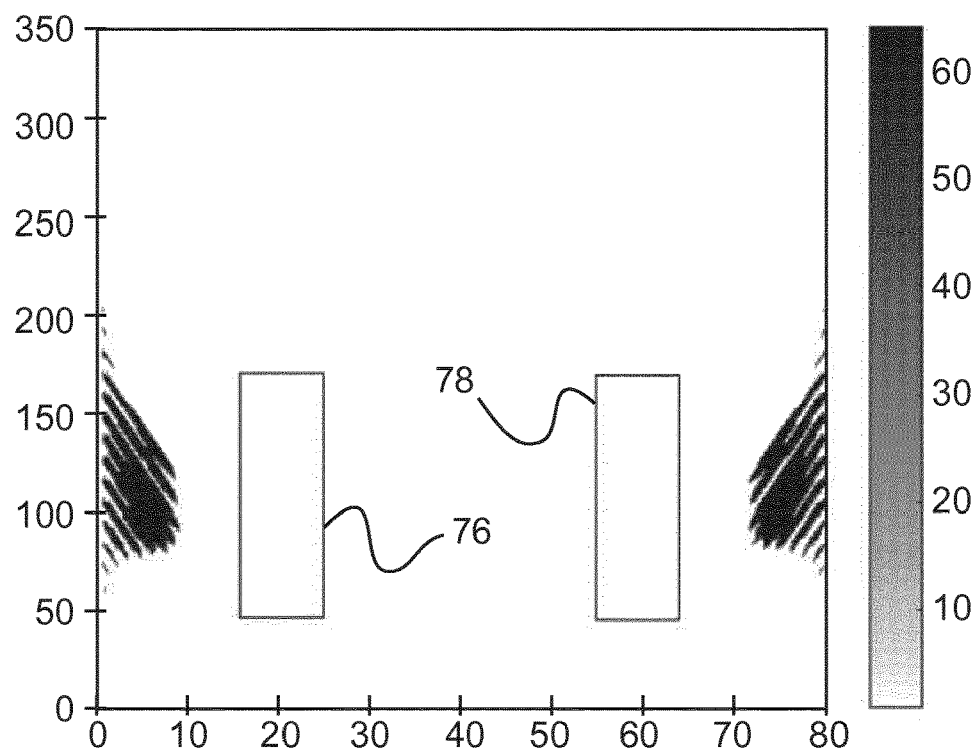
FIG. 6b illustrates a result of a simulation of the switch function (area of zero or negative pressure) of a highly loaded self-lubricated sliding bearing according to aspects of the invention.

FIG. 6b illustrates the "switch function" distribution of the highly loaded self-lubricated bearing according to the first aspect also illustrated in FIG. 5b (The switch function highlights areas of negative pressure). The location of the modified pumping pattern on the stationary bearing shaft having no grooves is shown by boxes 76 and 78. Notably, areas of negative pressure within the bearing are significantly reduced compared to the case of FIG. 6a.

According to a second aspect, there is provided a rotary X-Ray tube 80 comprising a self-lubricated sliding bearing according to the first aspect or its embodiments.

Figure 7:
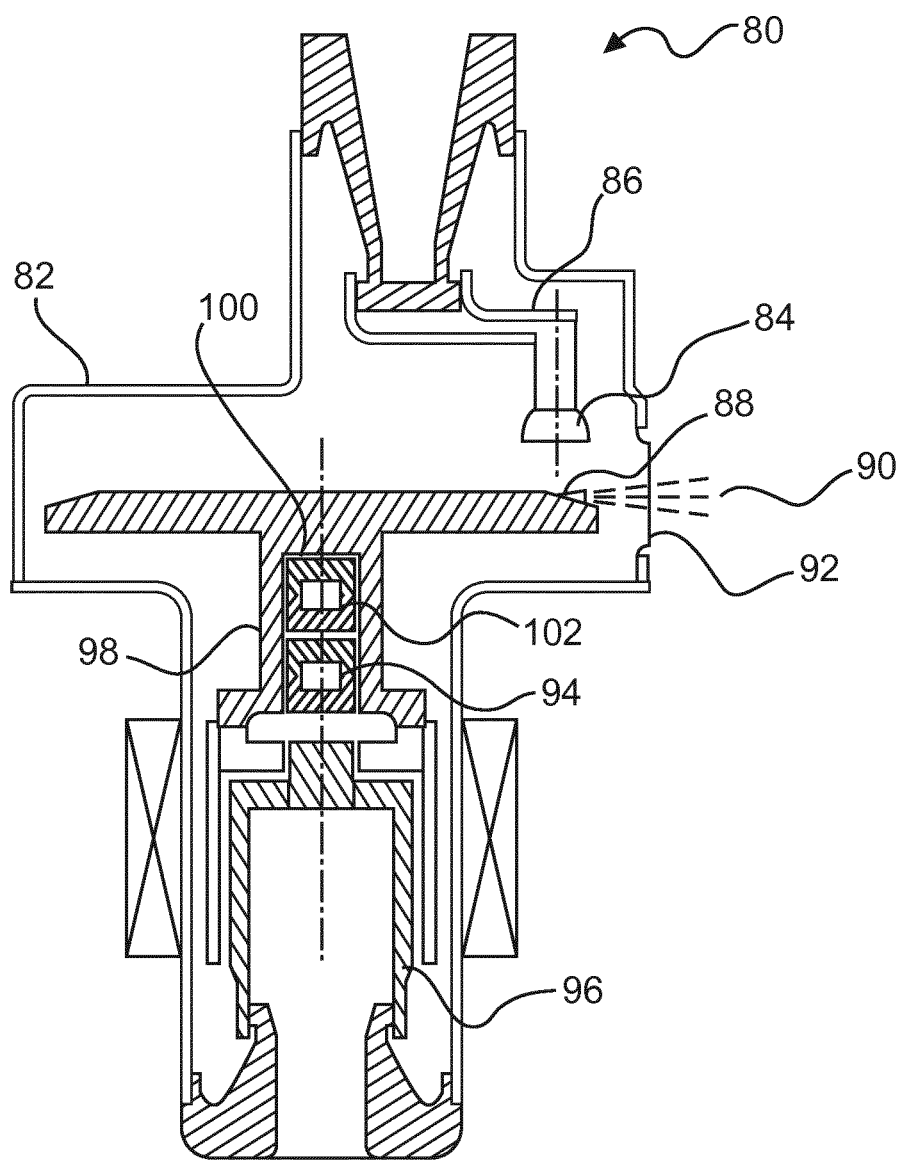
FIG. 7 illustrates a side cut-through view of a rotary X-Ray source according to a second aspect.
Figure 8:
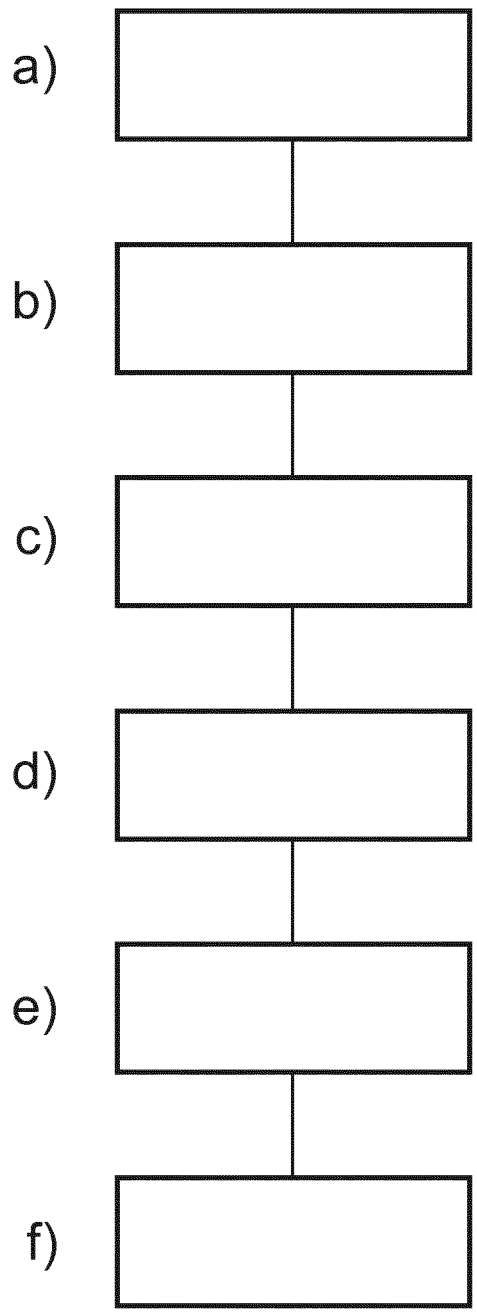
FIG. 8 schematically illustrates a method of manufacturing a self-lubricating sliding bearing the first aspect or its optional embodiments.

FIG. 7 illustrates a schematic side cut-through view of a rotary X-Ray tube according to the second aspect. The rotary X-Ray tube 80 comprises a metal frame 82 to which the cathode 84 is connected via a cathode isolator 86. The anode comprises a rotary anode disk 88. The rotary anode is connected to the metal frame 82 via an anode isolator. The cathode 84 is adapted for emitting electrons towards the anode disk 88, while the anode disc 88 provides a rotatable surface which generates X-rays 90 according to the "Bremsstrahlung" principle as a result of electrons emitted by the cathode 84 impinging on the anode disc at high energy. The X-rays 90 leave the metal frame 82, optionally via a grid filter (not shown), and via an X-Ray window 92, for example, made of beryllium. The rotatable anode disk is supported by the self-lubricating sliding bearing according to the first aspect or its optional embodiments, which is in turn connected to the anode isolator. The bearing shaft 94 is connected to a support 96. The bearing shaft 94 (first bearing member) is concentrically enclosed by the bearing bushing 98 (second bearing member). Although not shown, a bearing gap 100 between the bearing shaft 94 and the bearing bushing 98 comprises a liquid metal lubricant (eutectic) providing a thermal and electrical link between the rotating anode disc and the metal frame 82. Thus, the bearing bushing 98 is capable, under the influence of a radial load force, of acquiring a slight eccentric characteristic (in other words, the longitudinal axis of the bearing bushing 98 is angled away from the longitudinal axis of the bearing shaft 94). In the illustrated example, the bearing shaft 94 is provided with an interleaved pumping pattern 102. The pumping pattern 102 comprises a second and a third region having a modified pumping pattern, or a smooth surface but is less effective at pumping the lubricant in the bearing gap 100. Because the second and third regions are provided on the stationary bearing shaft 94, the second and third regions do not move relative to the frame of reference of a gantry supporting the rotary X-Ray source 80 during use.

Accordingly, if the second and third regions are aligned towards the direction of motion $\omega_g$ of the gantry (in the case of FIG. 7, the rotary X-Ray source will be mounted so that $\omega_g$ is in the direction parallel to the shaft and rotor of the bearing (i.e. X-Ray tube is moving upwards out of the page), a radial load source on the bearing (and hence eccentricity) can be reduced.

According to a third aspect, there is provided an X-ray imaging system 10 comprising:

a region of interest 12 for performing X-ray imaging of a patient 14;

a gantry surrounding the region of interest;

an X-ray source 18 comprising the rotary X-ray tube according to claim 10 mounted to the gantry and movable around the region of interest; and an X-ray detector 22 configured to receive X-rays emitted by the X-ray source.

The rotary X-ray tube is aligned in the X-ray source so that the second region of the self-lubricated sliding bearing is aligned with a centrifugal force exerted on the X-ray tube by the motion of the X-ray source around the gantry in use, so that the centrifugal force is opposed by a bearing force generated by the pumping action of the lubricant, to thus reduce an eccentricity of the longitudinal axis of the first bearing member with respect to an axis of second bearing member.

Optionally, the X-Ray imaging system is a CT scanner or a C-arm.

According to a fourth aspect, there is provided a method of manufacturing a self-lubricated sliding bearing comprising:

a) providing a first bearing member;
b) providing a second bearing member configured to concentrically enclose a portion of the first bearing member;
c) forming a cooperating surface of the second bearing member or the first bearing member comprising a first region comprising a pumping pattern configured to pump a lubricant;
d) forming a cooperating surface of the second bearing member or the first bearing member comprising a second region having a modified pumping pattern, or a smooth surface, wherein the second region is disposed on the cooperating surface of the second bearing member or the first bearing member such that, in use, a bearing force generated by the pumping action of the lubricant opposes a radial load force exerted on the self-lubricated sliding bearing in use, to thus reduce an eccentricity of an axis of the first bearing member with respect to an axis of second bearing member;
e) introducing a lubricant into a gap between the first and second bearing members; and
f) sealing the first and second bearing members.

Optionally, the first and/or second bearing members may be provided using materials such as molybdenum, although many other similar, suitable materials may be used.

The pumping pattern may be provided using, for example, laser sintering. The laser sintering process is applied such that the modified pumping pattern comprising a second region of grooves having a reduced or varying depths, or a second region having no grooves, is fabricated at the same time as the general pumping pattern using the same laser sintering machine. The laser sintering process may be used to provide second and/or third regions as discussed in relation to the first aspect above. Alternatively or in combination, the second region having a modified pumping pattern or smooth surface may be provided using acid or plasma etch or plasma deposition techniques, for example. Optionally, prior to sealing the bearing, a degassing procedure is performed.

It should be noted that aspects and embodiments of the invention have been described with reference to different subject matter. In particular, some embodiments are described with reference to method-type claims, whereas other embodiments are described with reference to device-type claims. A person skilled in the art will, however, gather from the above and following description, that, unless otherwise notified, in addition to any combination of features belonging to one type of subject-matter, also any combination between features related to different subject-matter is considered to be disclosed with this application. All features discussed herein can be combined providing synergetic effects that are more than simply a summation of the features. While the invention has been illustrated and described in detail in the drawings and foregoing description, such illustration and description are to be considered illustrative or exemplary, and not restrictive. The invention is not limited to the disclosed embodiments. Other variations to the disclosed embodiments can be understood and effected by those skilled in the art practicing the claimed invention from a study of the drawings. The disclosure, and the dependent claims.

In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A self-lubricated sliding bearing for a rotary X-ray tube, comprising:
    a first bearing member;
    a second bearing member configured to concentrically enclose a portion of the first bearing member; and
    a lubricant comprised in a gap between cooperating surfaces of the first bearing member and the second bearing member;
    wherein the cooperating surface of the second bearing member or the first bearing member comprises a first region comprising a pumping pattern configured to pump the lubricant;
    wherein the cooperating surface of the second bearing member or the first bearing member comprises a second region having a modified pumping pattern or a smooth surface;
    wherein the second region is disposed on the cooperating surface of the second bearing member or the first bearing member such that a bearing force generated by the pumping action of the lubricant opposes a radial load force exerted on the self-lubricated sliding bearing to reduce an eccentricity of a longitudinal axis of the first bearing member with respect to a longitudinal axis of second bearing member;
    wherein the modified pumping pattern comprises a surface having a groove depth and/or width that becomes continuously shallower around a circumferential length compared to the groove depth and/or width of the pumping pattern of the first region.

2. The self-lubricated sliding bearing according to claim 1, wherein the second region is located on the cooperating surface of the first or second bearing member at a first point defined by a first axial length along a first direction of the longitudinal axis of the respective first or second bearing member, and a first circumferential length around the circumference of the cooperating surface of the respective first bearing member or second bearing member.

3. The self-lubricated sliding bearing according to claim 1, wherein the position on the circumference of the cooperating surface of the respective first bearing member or second bearing member is aligned with the radial load force exerted on the self-lubricated sliding bearing.

4. The self-lubricated sliding bearing according to claim 1, wherein the cooperating surface of the second bearing member or the first bearing member further comprises a third region having a further modified pumping pattern compared to the second region or the smooth surface, wherein the third region is located on the cooperating surface of the first or second bearing member at a second point defined by a second axial length along a first direction of the longitudinal axis of the respective first or second bearing member, and a second circumferential length around the cooperating surface of the respective first bearing member or second bearing member.

5. The self-lubricated sliding bearing according to claim 1, wherein the second circumferential length around the cooperating surface of the respective first bearing member or second bearing member is the same as the first circumferential length, so that the first and second points defining the locations of the respective second and third regions are in circumferential alignment along the longitudinal axis of the first bearing member or second bearing member.

6. The self-lubricated sliding bearing according to claim 1, wherein the modified pumping pattern comprises a surface with a smaller groove depth and/or width compared to the groove depth and/or width of the pumping pattern of the first region.

7. The self-lubricated sliding bearing according to claim 1, wherein the second region comprises a modified pumping pattern comprising a modified groove geometry compared to the pumping pattern of the first region.

8. The self-lubricated sliding bearing according to claim 1, wherein the second region has an area in a range of 5-30% in proportion to the total surface of the first or second bearing members.

9. A rotary X-ray tube comprising a self-lubricated sliding bearing according to claim 1.

10. An X-ray imaging system, comprising:
   an X-ray source comprising a rotary X-ray tube mounted to the gantry and movable around the region of interest;
   a self-lubricated sliding bearing comprising:
      a first bearing member;
      a second bearing member configured to concentrically enclose a portion of the first bearing member; and
      a lubricant comprised in a gap between cooperating surfaces of the first bearing member and the second bearing member;
      wherein the cooperating surface of the second bearing member or the first bearing member comprises a first region comprising a pumping pattern configured to pump the lubricant;
      wherein the cooperating surface of the second bearing member or the first bearing member comprises a second region having a modified pumping pattern or a smooth surface;
      wherein the second region is disposed on the cooperating surface of the second bearing member or the first bearing member such that a bearing force generated by the pumping action of the lubricant opposes a radial load force exerted on the self-lubricated sliding bearing to reduce an eccentricity of a longitudinal axis of the first bearing member with respect to a longitudinal axis of second bearing member;
      wherein the modified pumping pattern comprises a surface having a groove depth and/or width that becomes continuously shallower around a circumferential length compared to the groove depth and/or width of the pumping pattern of the first region; and
   an X-ray detector configured to receive X-rays emitted by the X-ray source.

11. A method of manufacturing a self-lubricated sliding bearing, comprising:
   providing a first bearing member;
   providing a second bearing member configured to concentrically enclose a portion of the first bearing member;
   forming a cooperating surface of the second bearing member or the first bearing member comprising a first region comprising a pumping pattern configured to pump a lubricant;
   forming a cooperating surface of the second bearing member or the first bearing member comprising a second region having a modified pumping pattern or a smooth surface, wherein the second region is disposed on the cooperating surface of the second bearing member or the first bearing member, such that a bearing force generated by the pumping action of the lubricant opposes a radial load force exerted on the self-lubricated sliding bearing to reduce an eccentricity of a longitudinal axis of the first bearing member with respect to a longitudinal axis of the second bearing member;
   introducing a lubricant into a gap between the first and second bearing members; and
   sealing the first and second bearing members, wherein the modified pumping pattern comprises a surface having a groove depth and/or width that becomes continuously shallower around a circumferential length compared to the groove depth and/or width of the pumping pattern of the first region.

* * * * *